UNITED STATES PATENT OFFICE 2,560,242

ALPHA-ALKYL,4-ALKYL CYCLOHEXYL-BUTYRIC ACIDS

Earl L. Pelton and Andrew A. Holzschuh, Midland, Mich., assignors to The Dow Chemical Company, Midland, Mich., a corporation of Delaware No Drawing. Application January 3, 1949,
Serial No. 69,036

2 Claims. (Cl. 260—514)

This invention relates to certain new γ-alkyl caproic acids and to certain γ,4-di-alkyl-2-cyclohexene-1-caproic acids and α,4-di-alkyl cyclohexanebutyric acids.

In the preparation of medicinals and other interesting compounds, including plasticizers, it is sometimes desirable to use as a starting material a branched chain aliphatic acid. One class of such compounds which has not been available heretofore is a group of γ-alkyl caproic acids, the 4-alkyl 2 - cyclohexene - 1 - substitution products thereof, and the butyric acid saturated analogs of such compounds, wherein the alkyl groups contain from 3 to 6 carbon atoms, inclusive.

We have now found that acids of the stated class may be formed readily by the process described by one of us in U. S. Patent 1,961,623, applied in the present instance to 4-alkyl cyclohexanols. That process consists essentially in heating the substituted cyclohexanol with a fused alkali metal hydroxide, or mixture of such hydroxides, at temperatures in the range from 290° to 375° C., to effect oxidative scission of the ring, and recovering the resulting organic acids after acidification of the reaction mixture with a mineral acid.

The following examples will illustrate the method of preparing the new acids:

Example 1

50 pounds of 90 per cent potassium hydroxide was mixed with 5 pounds of sodium acetate, to lower the viscosity of the mixture when molten, and was heated to 350° C. in a horizontal, nickel-lined cylindrical reaction vessel about 18 inches in diameter and 30 inches long. The vessel contained a horizontally disposed rotary shaft with nickel stirrer blades mounted thereon, and was provided with an inlet for the alkyl cyclohexanol and an outlet for hydrogen, steam or other gases and vapors. The latter outlet was connected with a water-cooled condenser. There was added to the fused caustic alkali in the course of 16 hours about 73 pounds of 4-tertiary butyl cyclohexanol, which had been melted in a steam-heated funnel. The reaction temperature was reduced to 300° C. and held for several hours. The reaction mixture was then cooled, dissolved in water, and acidified with hydrochloric acid. The organic compounds separated from the resulting brine and were dried and distilled. There was obtained 76 per cent of the theoretical yield of γ-tertiary butyl caproic acid and a 4 per cent yield of α,4-di-tertiarybutyl cyclohexanebutyric acid.

Example 2

In the apparatus described in Example 1, there was placed 50 pounds of an equimolar mixture of sodium and potassium hydroxides and 5 pounds of sodium acetate. This mixture was fused and heated to 300° C., and 126 pounds of 4-tertiary butyl cyclohexanol was added over the course of 16 hours. Under these reaction conditions, using a lower fusion temperature, more of the alcohol entered into condensation reactions, and there was obtained 97 pounds of an oily mixture of organic material consisting of 1.5 per cent low boiling fraction
10.0 per cent γ-tertiarybutyl caproic acid
73.5 per cent α,4-di-tertiary butyl cyclohexanebutyric acid
15.0 per cent dark brown resin

Example 3

When equal weights of potassium hydroxide and 4-secondary butyl cyclohexanol were heated together at 350° C., and the product recovered as before, there was obtained a 46.8 per cent yield of γ-secondarybutyl caproic acid and a 19.5 per cent yield of α,4-di-secondarybutyl cyclohexanebutyric acid, together with about 5 per cent of γ,4-di-secondarybutyl 2-cyclohexene-1-caproic acid.

Example 4

1000 parts by weight of 4-isopropyl cyclohexanol, 750 parts of potassium hydroxide and 100 parts of potassium acetate were caused to react in similar manner at 330° C. The product was recovered as before and, based on the amount of the alcohol used, the yields of the respective acids were:

14.2 per cent γ-isopropyl caproic acid
13.1 per cent α,4-di-isopropyl cyclohexanebutyric acid
41.0 per cent γ,4-di-isopropyl 2-cyclohexene-1-caproic acid In a similar manner, numerous other γ-alkyl caproic acids, α,4-di-alkyl cyclohexanebutyric acids, and γ,4-di-alkyl 2-cyclohexane-1-caproic acids are produced, having from 3 to 6 or more carbon atoms in the alkyl radical. The substituted butyric acids which are obtained by the described process are undoubtedly the result of the alkaline oxidation of previously formed caproic acid compounds, with two carbon atoms going to form sodium acetate. The alkyl caproic acids result directly from the oxidative scission of the original 4-alkyl cyclohexanols. The α,4-di-alkyl cyclohexanebutyric acids and the γ,4-di-alkyl 2-cyclohexene-1-caproic acids are indications of the formation, as intermediates, of condensation products containing two alkylcyclohexyl groups, only one of which retains an alcoholic structure and is susceptible to further oxidative action of the hot alkali bath.

Among the new compounds of the present invention, the following are of especial interest:

| Name | Identifying Properties | | | | | |
|---|---|---|---|---|---|---|
| | Physical form | M. P., °C. | B. P., °C./mm. | Density 25°/4° C. | Refractive index 25° C./D | Amide, M. P., °C. |
| γ-isopropyl caproic acid | liquid | | 129/10 | 0.9261 | 1.4363 | 82.3-83 |
| γ-secondarybutyl caproic acid | do | | 139/10 | 0.9213 | 1.4405 | 59.5-60.5 |
| γ-tertiarybutyl caproic acid | do | | 140-2/10 | 0.918 (20°) | 1.4423 (20°) | 93.1-93.7 |
| γ,4-di-isopropyl 2-cyclohexene-1-caproic acid | do | | 207/5 | | | |
| α,4-di-isopropyl cyclohexane-butyric acid | do | | 180-2/5 | 0.9381 | 1.4651 | |
| α,4-di-secondarybutyl cyclohexanebutyric acid | do | | 192/3 | 0.9820 | 1.4702 | |
| α,4-di-tertiarybutyl cyclohexanebutyric acid | solid | 107.5-108.5 | 215/10 | | | |

With exception of the last-named acid which is a white crystalline solid, all of the acids listed in the table are oily liquids, whose viscosity is roughly proportional to their molecular weights.

The new compounds, all obtainable by the fusion of 4-alkyl cyclohexanols with caustic alkalies, have the general formula

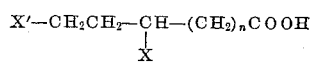

wherein X is an alkyl radical having from 3 to 6 carbon atoms, inclusive; $n$ has one of the values 0 and 2; when $n$ is 2, X' is selected from the group consisting of hydrogen and the 4-alkyl 2-cyclohexenyl radical, alkyl being the same as X; and, when $n$ is 0, X' is the 4-alkyl cyclohexyl radical, alkyl being the same as X.

We claim:
1. An α,4-di-alkyl cyclohexanebutyric acid, in which the alkyl groups are alike and have from 3 to 6 carbon atoms, inclusive.

2. α,4-di-tertiarybutyl cyclohexanebutyric acid.

EARL L. PELTON.
ANDREW A. HOLZSCHUH.

REFERENCES CITED

The following references are of record in the file of this patent:

UNITED STATES PATENTS

| Number | Name | Date |
|---|---|---|
| 1,961,623 | Pelton | June 5, 1934 |
| 2,130,989 | Schimmelschmidt | Sept. 20, 1938 |

OTHER REFERENCES

Burton et al.: Beilstein (Handbuch, 4th ed.), vol. 2, p. 350 (1920).

Adams et al.: J. Am. Chem. Soc., vol. 49, pp. 2934-2940 (1927).

Advani et al.: Beilstein (Handbuch, 4th ed., 2nd suppl.), vol. 2, p. 299 (1942).